United States Patent [19]

Lane

[11] Patent Number: 4,581,091
[45] Date of Patent: Apr. 8, 1986

[54] CARPET TAPE LAYER

[76] Inventor: Kenneth A. Lane, 23137 Tamarack St., St. Francis, Minn. 55070

[21] Appl. No.: 694,069

[22] Filed: Jan. 23, 1985

[51] Int. Cl.$^4$ .......................... B31F 5/06; B32B 31/04
[52] U.S. Cl. ................................ 156/304.4; 156/304.6; 156/304.7; 156/309.9; 156/391; 156/499; 156/505; 156/577; 156/579
[58] Field of Search ............... 156/304.3, 304.4, 304.6, 156/304.7, 309.9, 391, 499, 505, 523, 527, 574, 577, 579

[56] References Cited

U.S. PATENT DOCUMENTS

| | | | |
|---|---|---|---|
| 3,574,042 | 4/1971 | McMullen et al. | 156/577 |
| 3,660,191 | 5/1972 | Shimota et al. | 156/304.6 |
| 3,748,211 | 7/1973 | Hoopengardner | 156/575 |
| 4,438,323 | 3/1984 | Milnes | 156/304.7 |

Primary Examiner—Michael Wityshyn

[57] ABSTRACT

An apparatus and method for dispensing carpet seam tape below and centered with respect to juxtaposed edges of adjacent carpet sections. The apparatus includes a tape holding container having a tape discharge passage. The container is mounted between the juxtaposed edges of adjacent carpet sections and operatively moved in a direction substantially parallel to the juxtaposed edges of the adjacent carpet sections. As it is moved, the dispenser directionally dispenses the tape through the discharge passage centered below the juxtaposed carpet edges. A trailing plate is detachably secured to the tape holding container in alignment with the discharge passage, so that the tape is dispensed across the trailing plate. The juxtaposed edges of the carpet sections are then pressed into bonding engagement with the adhesive tape which is supported on the trailing plate.

20 Claims, 3 Drawing Figures

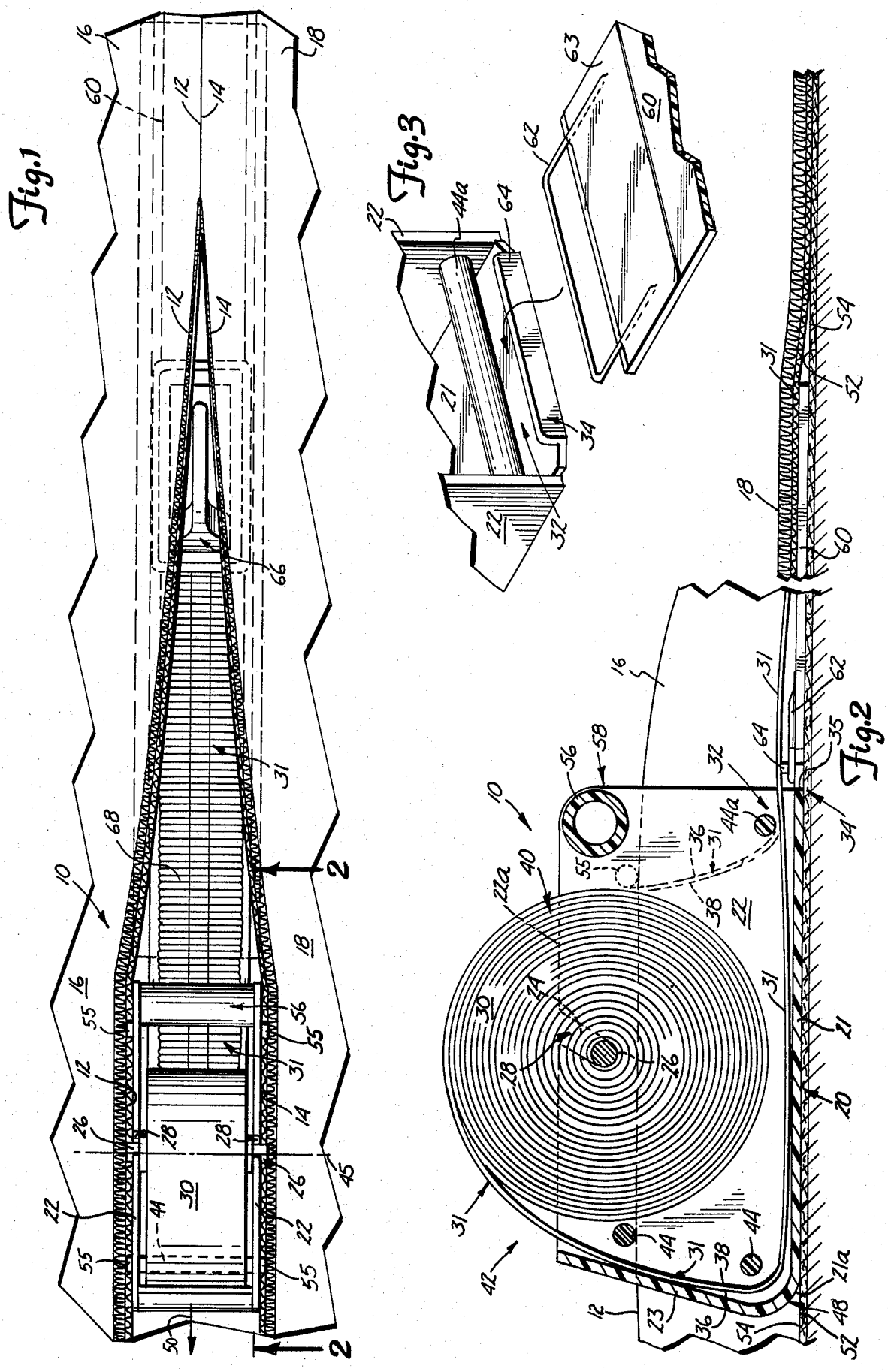

CARPET TAPE LAYER

BACKGROUND OF THE INVENTION

1. Field of the Invention

The present invention relates generally to an apparatus for centering carpet seam tape between and below juxtaposed edges of adjacent carpet sections which carpet sections are to be joined together by the tape.

2. Description of the Prior Art

Tape holders arranged to directionally release tape parallel to and underlying juxtaposed edges of adjacent carpet sections have been used in the past. U.S. Pat. No. 3,748,211 to Hoopengardner discloses a box-shaped carpet seaming tape dispenser dimensioned for mounting between upturned juxtaposed edges of adjacent carpet sections which are to be joined together. The dispenser is arranged to directionally release tape parallel to the juxtaposed edges and further includes means for retaining the dispenser centrally between the carpet edges. The tape is dispensed directly on the floor which the carpet is to cover. An underlying carpet pad of resilient material is usually laid below carpet and the resiliency of the carpet pad supports the adhesive tape in an uneven fashion, making it difficult to properly bond the tape to the carpet sections. This problem becomes even more significant when the carpet seaming tape being used is a tape having a thermal activated adhesive which must be heated before the carpet sections can be bonded to the tape. The lack of a relatively rigid backing for the tape makes it difficult to uniformly heat the adhesive which can result in "spotty" adhesion between the tape and the carpet sections.

There is a need to find a carpet tape dispenser which is easily maneuvered to position carpet seam tape centrally below juxtaposed edges of adjacent carpet sections and which also provides means for supporting the tape when bonding the carpet sections thereto.

SUMMARY OF THE INVENTION

The present includes apparatus for and a method of dispensing carpet seam tape centrally between and underneath juxtaposed edges of adjacent carpet sections.

The apparatus of the present invention includes a tape holding container defining a tape discharge passage, which container is arranged to be mounted between juxtaposed edges of adjacent carpet sections. The tape holding container is moved substantially parallel with and between the carpet edges while dispensing tape through the discharge passage. A trailing plate is detachably connected to the tape holding container in alignment with the discharge passage, so that as tape is dispensed, the tape is supported on the trailing plate under the juxtaposed edges of the carpet sections. The juxtaposed edges of the carpet sections are moved into bonding engagement with the adhesive tape while the tape is supported on the trailing plate. Because the tape is supported in a substantially planar manner on the trailing plate, a uniform bond may be achieved between the tape and carpet sections.

BRIEF DESCRIPTION OF THE DRAWINGS

FIG. 1 is a top plan view of a carpet tape dispenser of the present invention illustrating the dispenser positioned between juxtaposed edges of adjacent carpet sections and a heating iron for heating the carpet seaming tape dispensed from the dispenser while the tape is supported on a trailing plate (shown partially in phantom) which is detachably secured to a tape holding container;

FIG. 2 is a side elevational view of the carpet tape dispenser of the present invention, with some parts shown in section and broken away, illustrating a roll of adhesive tape being dispensed from the tape holding container across the trailing plate; and FIG. 3 is a partial perspective view of portions of the trailing plate and tape holding container of the present invention in a detached aligned positioned.

DETAILED DESCRIPTION OF THE PREFERRED EMBODIMENTS

The carpet seam tape dispenser of the present invention is generally illustrated at 10 in FIGS. 1 and 2. Tape dispenser 10 is arranged to be mounted between two juxtaposed edges 12 and 14 of adjacent carpet sections 16 and 18, as illustrated in FIG. 1. Tape dispenser 10 includes a tape holding container 20 which has a bottom wall 21 joined at side edges thereof to two substantially parallel side walls 22. Preferably, the bottom wall 21 is connected at a forward end 21a thereof to front wall 23 which is generally perpendicular to the side walls 22 and joined thereto along adjacent edges.

The side walls 22 have similar upper edges 22a which are preferably generally horizontal. Each upper edge 22a has an inclined generally vertical slot 24 within which a spindle 26 is rotatably mounted. Each longitudinal end 28 of spindle 26 has a reduced circular cross section which is supported for rotation within one of the inclined slots 24 defined by support walls 22. Supported on spindle 26 is a roll of carpet seaming tape 30. A discharge passage 32 is defined through a lower rear end 34 of the tape holding container 20, through which tape 31 from the roll of tape 30 is directionally dispensed. The discharge passage 34 is preferably adjacent a rear end 35 of bottom wall 21. The tape 31 is dispensed through the discharge passage 32 so that the tape 31 is centered between and disposed below the juxtaposed edges 12 and 14 of the carpet sections 16 and 18.

The arrangement by which the roll of tape 30 is mounted on the tape holding container 20 permits the tape 31 to be selectively dispensed in two ways. As shown in solid lines in FIG. 2, when the roll of tape 30 is mounted to dispense tape 31 from a rear side 40 thereof, an external surface 36 of the tape 31 faces generally upward. When the roll of tape 30 is mounted to dispense tape 31 from a front side 42 thereof an internal surface 38 of the tape 31 faces generally upward. The tape 31 is dispensed in a direction substantially perpendicular to the axis of rotation of the roll of tape 30, as seen in FIGS. 1 and 2.

As seen in FIG. 2, a pair of generally cylindrical tape guides 44 are positioned at the front of the tape holding container 20. Another generally cylindrical tape guide 44a is positioned at the rear of the container 20. The tape guides 44 and 44a extend between the side walls 22 along lateral axes in substantially parallel alignment with an axis of rotation 45 defined by spindle 26 when mounted in the slots 24 on the side walls 22 of the tape holding container 20. Tape guides 44 and 44a act to guide the tape 31 from the roll 30 to the discharge passage 32. Tape 31 is frictionally drawn over tape guides 44 and 44a (depending on the "pay out" orientation of the roll of tape 30), which act to resist movement of tape 31 from the roll of tape 30 to the discharge passage 32. This assures that the tape 31 is continually dispensed in a substantially taut manner, even if the roll of tape 30 should partially unravel within the tape holding container 20.

Tape guides 44 and 44a are positioned to draw the tape 31 off the roll of tape 30 downwardly in a generally vertical direction, whether the roll of tape 30 is mounted to dispense tape 31 from the rear side 40 or front side 42 of the roll of tape 30. Tape guides 44 and 44a are positioned to direct the tape 31 in a substantially horizontal direction through the discharge passage 32. This change in tape movement direction (from generally vertical to substantially horizontal) establishes a frictional engagement between the tape 31 and the tape guides 44 and 44a.

Adjacent the forward end 21a of the bottom wall 21, container 20 has a nose portion 48. Nose 48 is preferably defined by a convex curvature of a front lower lateral edge of the container 20 which, when the container is moved in an operative direction indicated by arrow 50 in FIGS. 1 and 2, acts to direct the nose 48 of the container 20 up and over a support surface 52 on which the container 20 is supported. Nose 48 is particularly useful when the dispenser 10 is supported upon a carpet padding 54 which has already been laid upon the support surface 52. Nose 48 substantially prevents the lower front edge of the dispenser 10 from catching and/or damaging the carpet padding 54 when the dispenser 10 is moved in direction of arrow 50. Carpet edge alignment pegs 55 are mounted to extend outwardly from the side walls 22, as seen in FIG. 1. The edges 12 and 14 engage these pegs 55 during operation to maintain the tape dispenser 10 in proper alignment relative to the carpet.

A cylindrical handle 56 is mounted between side walls 22, preferably at an upper rear end of the side walls 22 of the container 20. Longitudinal ends of handle 56 are secured to the parallel side walls 22 of container 20 so that handle 56 is aligned substantially parallel with spindle 26. In this position, handle 56 does not interfere with the dispensing of the tape 31 through the discharge passage 32 and is conveniently positioned for a carpet layer working behind the dispenser 10 to push the dispenser 10.

Detachably secured to the container 20 adjacent the discharge passage 32 is a flexible, substantially planar trailing plate 60. Various means are contemplated for removably securing trailing plate 60 to the container 20. In a preferred embodiment, trailing plate 60 includes an engaging loop 62 suitably fastened at one end thereof, such as by tape 63. The loop 62 is formed to mate with a support flange 64 defined at the lower rear end 34 of the tape holding container 20 (as illustrated by arrow 65 in FIG. 3). When so mated, trailing plate 60 trails behind the container 20 in longitudinal alignment with the discharge passage 32. As tape 31 is dispensed from the container 20, tape 31 is supported on the trailing plate 60 and under the edges 12 and 14 of carpet sections 16 and 18.

Trailing plate 60 is preferably an elongated panel approximately 4.5 inches wide, 0.20 inches high and three feet long, which is of size suitable to support most conventional carpet seam tapes. The length of the trailing plate 60 provides sufficient working room to prepare the adhesive carried by the tape 31, if needed, and to position and bond the juxtaposed edges 12 and 14 of the adjacent carpet sections 16 and 18, respectively, to the tape 31, while tape 31 is supported on the trailing plate 60. Because of the relative thinness of the trailing plate 60, the carpet edges 12 and 14 lie substantially parallel with and over the planar trailing plate 60 while being bonded to the tape 31. This orientation permits the carpet edges 12 and 14 to be uniformly bonded to the tape 31 to seam the adjacent carpet sections 16 and 18 together.

Trailing plate 60 is particularly useful when the tape 31 carries an adhesive which must be prepared before adjacent carpet sections 16 and 18 can be bonded together by the tape 31. An example of this is a thermal setting adhesive 68 carried by the tape 31 which must first be heated prior to bonding carpet sections 16 and 18 to the tape 31. A seaming iron 66, as shown in FIG. 1, is typically used to uniformly preheat the thermal setting adhesive 68 while the tape 31 is supported on the trailing plate 60. Trailing plate 60 also acts to protect the support surface 52 and carpet padding 54 from the heat generated by the seaming iron 66.

In operation, a roll of tape 30 is rotatably mounted on spindle 26 within the container 20 to dispense the tape 31 with the adhesive carrying surface facing upward. Trailing plate 60 is attached to container 20 and the entire assembly is centrally mounted between the two juxtaposed edges 12 and 14 of adjacent carpet sections 16 and 18, with the trailing plate 60 disposed below the carpet sections 16 and 18 as seen in FIGS. 1 and 2. A portion of the tape 31 is paid out of the container 20 through discharge passage 32, supported on trailing plate 60, and centered between and disposed below the juxtaposed edges 12 and 14 of adjacent carpet sections 16 and 18. A terminal end of the paid out portion of tape 31 is fixed in position relative to the carpet sections 16 and 18 by suitable means (such as by use of the adhesive borne thereon). Dispenser 10 is then operatively moved in a direction substantially parallel with the carpet edges 12 and 14. As dispenser 10 is moved, tape 31 is directionally dispensed from the tape roll 30, through the discharge passage 32 and across the trailing plate 60. The configuration of container 20 directs the juxtaposed edges 12 and 14 of the adjacent carpet sections 16 and 18 around the container 20 as the dispenser 10 is moved, and holds the juxtaposed edges 12 and 14 in a converging spaced relationship over a portion of the length of the trailing plate 60.

If the tape 31 has a thermal setting adhesive 68, the carpet layer heats the adhesive 68 with the seaming iron 66 as the tape 31 is dispensed across the trailing plate 60, to activate the adhesive 68. Preferably, seaming iron 66 is disposed between the spaced edges 12 and 14 of the carpet sections directly behind the container 20, as illustrated in FIG. 1. As the operator coincidentally moves the dispenser 10 and seaming iron 66 in the operative direction 50, the juxtaposed edges 12 and 14 of the adjacent carpet sections 16 and 18 will converge behind the the iron 66 into bonding engagement with a portion of the tape 31 still supported on the trailing plate 60. The juxtaposed edges 12 and 14 of the adjacent carpet sections 16 and 18 may then be firmly pressed into bonding engagement with the tape 31 to seam the two sections of carpet 16 and 18 together.

The dispenser 10 and seaming iron 66 are continually moved in this manner until the juxtaposed edges 12 and 14 of the adjacent carpet sections 16 and 18 are completely seamed together by the tape 31. If the dispenser 20 runs into an obstacle, such as an abutting wall, prior to completing the seam between the two carpet sections 16 and 18, an appropriate amount of unused tape 31 is paid out of the container 20 and container 20 is detached from the trailing plate 60 and removed from between the carpet sections 16 and 18. Trailing plate 60 is then repositioned to support the unused strip of tape 31, tape 31 is heated to activate the adhesive 58, and the unbonded portions of the adjacent carpet sections 16 and 18 are bonded to the unused strip of tape 31. The trailing plate 60 is then removed from beneath the now joined carpet sections 16 and 18. The trailing plate 60 is rigid relative to the carpet and padding. It can be removed from beneath the carpet, however, by pivoting the trailing plate 60 about its forward end (the end next to the wall) so that it is generally parallel and adjacent to the wall. The edge of the carpet next to the wall is then turned up slightly to permit removal of the trailing plate 60.

Although the present invention has been described with reference to preferred embodiments, workers skilled in the art will recognize that changes may be made in form and detail without departing from the spirit and scope of the invention.

What is claimed is:

1. A carpet seam tape dispenser for supportably dispensing carpet seam tape below and centered with respect to juxtaposed edges of adjacent carpet sections, the tape dispenser comprising:
   tape holding container means having a tape discharge passage, the container means being mountable between juxtaposed edges of adjacent carpet sections and further arranged to directionally dispense carpet seam tape through the tape discharge passage such that the tape is centered below the juxtaposed edges of the adjacent carpet sections; and
   trailing plate means detachably secured to the tape holding container means in alignment with the discharge passage such that as tape is dispensed from the tape holding container means, the tape is supported on the trailing plate means below the juxtaposed edges of the adjacent carpet sections.

2. The tape dispenser of claim 1 wherein the trailing plate means is a thin elongated board, at least as wide as the carpet seam tape.

3. The tape dispenser of claim 1 wherein the carpet sections lie on a support surface and wherein the tape holding container means has a nose portion for guiding the dispenser over the support surface.

4. The tape dispenser of claim 1 wherein the nose portion is a convex surface defined at a frontmost lower edge of the tape dispenser.

5. The tape dispenser of claim 1 wherein the container means includes means for selectively, rotatably supporting a roll of carpet seam tape between a first position which causes an outward facing surface of the tape to appear uppermost as the tape is paid out of the tape dispenser through the discharge passage and a second position which causes an inward facing surface of the tape to appear uppermost as the tape is paid out of the tape dispenser through the discharge passage.

6. The tape dispenser of claim 5 wherein the container means includes guide means for guiding the carpet seam tape into the discharge passage.

7. The tape dispenser of claim 5 wherein the roll of tape has an axis of rotation which is generally perpendicular to the juxtaposed edges of the adjacent carpet sections, and the tape dispenser has handle means having an axis aligned substantially parallel with the axis of rotation of the roll of tape.

8. The tape dispenser of claim 5 wherein the container means includes parallel, spaced apart side walls with axially aligned inclined slots defined therein and a spindle for supporting the roll of tape, the spindle having opposite ends thereof rotatably supported in the slots of the side walls.

9. In a carpet seam tape dispenser of the type having tape holding container means for supporting a roll of carpet seam tape to directionally dispense the tape beneath juxtaposed edges of adjacent carpet sections, the improvement comprising:
   trailing plate means detachably secured to the tape dispenser such that tape dispensed from the tape holding container means will be directed across and supported on the trailing plate means and centered below the juxtaposed edges of the adjacent carpet sections.

10. The tape dispenser of claim 9 wherein the tape dispenser defines a passage through which the carpet seam tape is directionally dispensed and further comprises:
    means for detachably mounting an end of the trailing plate means to the tape holding container means in alignment with the passage.

11. The tape dispenser of claim 9 wherein the trailing plate means is a thin elongated board, at least as wide as the carpet seam tape.

12. The tape dispenser of claim 9 wherein the carpet sections lie on a floor surface and wherein the tape dispenser includes a nose portion arranged to guide the tape dispenser over the floor surface as the tape dispenser is moved between the carpet sections.

13. The tape dispenser of claim 9 wherein the nose portion is a convex curved surface defined at a lower front edge of the tape dispenser.

14. The tape dispenser of claim 9 wherein the tape dispenser further includes handle means.

15. The tape dispenser of claim 10 wherein the means for detachably mounting is an upwardly extending flange and wherein the trailing plate means has a loop fixed to one end thereof, the loop being dimensioned to detachably mate with the upward extending flange.

16. The tape dispenser of claim 10 wherein the tape dispenser includes means for coincidentally guiding and resisting movement of the carpet seam tape from the roll to the discharge passage.

17. The tape dispenser of claim 16 and further comprising:
    means for selectively rotatably supporting the roll of tape on the tape dispenser between a first position which causes an outward facing surface of the tape to appear uppermost as the tape is paid out of the tape dispenser through the discharge passage and a second position which causes an inward facing surface of the tape to appear uppermost as the tape is paid out of the dispenser through the discharge passage.

18. A method of joining juxtaposed edges of adjacent carpet sections with adhesive tape, using trailing plate means detachably secured to tape dispenser means with the tape dispenser means being arranged to directionally dispense tape across the trailing plate means, comprising the steps of:
   positioning the dispenser means and trailing plate means between juxtaposed edges of adjacent carpet sections with the trailing plate disposed beneath the carpet sections;
   moving the dispenser in a direction parallel with the edges of the carpet sections while dispensing tape across the trailing plate;

pressing the juxtaposed edges of the carpet sections into bonding engagement with the adhesive tape while the tape is supported on the trailing plate means.

19. The method of claim 18 wherein the tape is thermal setting adhesive tape, and further comprising the step of:

heating the thermal setting adhesive tape while the tape is supported on the trailing plate means and prior to pressing the juxtaposed edges of the carpet sections into bonding engagement with the tape.

20. A method of joining juxtaposed edges of adjacent carpet sections includes the steps of: positioning a carpet seam tape dispenser between upturned juxtaposed edges of adjacent carpet sections;

moving the tape dispenser along and between the juxtaposed edges of the adjacent carpet sections;

dispensing thermal setting carpet seam tape in centered alignment under the juxtaposed adjacent carpet edges from the tape dispenser as it is moved;

supporting the tape as it is dispensed from the tape dispenser on a generally planar surface mounted to trail behind the tape dispenser as it is moved;

heating the tape while the tape is supported by the generally planar surface; and pressing the juxtaposed edges together and onto the heated tape.

* * * * *